Jan. 4, 1927. 1,613,080
I. BROBERG
LOCOMOTIVE HAVING CONDENSER
Filed Oct. 4, 1923

Inventor
I. Broberg
By Marks & Clerk
Attys.

Patented Jan. 4, 1927.

1,613,080

UNITED STATES PATENT OFFICE.

ISIDOR BROBERG, OF LIDINGO, SWEDEN, ASSIGNOR TO AKTIEBOLAGET LJUNGSTRÖMS ÅNGTURBIN, OF LIDINGO-BREVIK, SWEDEN.

LOCOMOTIVE HAVING CONDENSER.

Application filed October 4, 1923. Serial No. 666,591, and in Sweden October 7, 1922.

In locomotives it has always proved difficult to arrange the wheels in such a manner that a suitable running in curves may be obtained. Prescriptions for the extension of the locomotive beyond the normal profile prevent the constructor from placing the locomotive on the wheels in the simplest manner, because the sways of the locomotive, when running in curves, may not exceed a certain limit. These difficulties particularly appear in constructions where the locomotive is arranged on two vehicles, for instance in locomotives having a condenser placed on a separate vehicle, the vehicles being coupled together in such manner that a turning is possible about a so-called ideal turning axis. In large locomotive aggregates of the said type the vehicles and particularly the condenser vehicle will obtain a considerable length, and on account thereof it has to be placed on one or more bogies. The difficulties in placing the vehicles are increased by vehicles coupled together in usual manner by means of buffers and coupling devices having to be coupled together with other vehicles appertaining to the train. In this case the buffers of the condenser vehicle have to make, when running in curves, the same sway as do the buffers of the vehicle coupled to said condenser vehicle.

This invention relates to locomotives of the above kind and contemplates a device for arranging the wheels of the condenser vehicle. The invention consists in the frame of the condenser vehicle being placed on two bogies coupled together with each other, the rear bogie of which is capable of turning with respect to the frame of the vehicle about an axis located behind the rear pair of wheels of the rear bogie, counted in the normal running direction of the locomotive.

Figure 1:
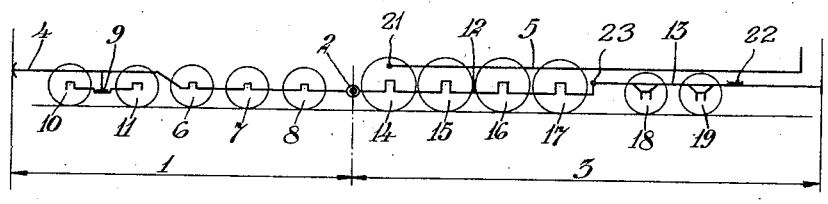
Figure 2:
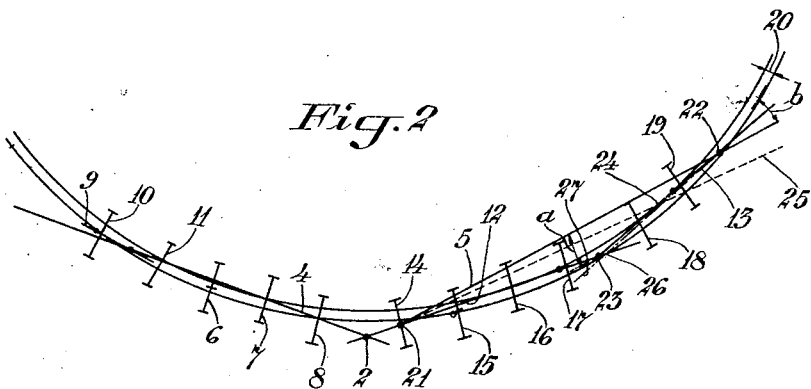

The invention is illustrated in the annexed drawing. Fig. 1 shows a side view of the placing of the wheels of the two vehicles of the locomotive on straight rails. Fig. 2 shows the positions of the wheels of the locomotive aggregate when running forwards in a curve, and having the vehicle carrying the boiler running before the vehicle carrying the condenser. In the figure the radius of curvature of the curve and the shaft distance of the locomotive are shown on a small scale compared with the rail extension varying with the magnitude of the curves, which extension is hereinbelow called the collar-play. In the case shown, the scales of the radius of curvature, the shaft distance and the collar-play are as 10:100:1000.

In Fig. 1, 1 designates that part of the locomotive aggregate which carries, substantially, the boiler of the locomotive and forms a separate vehicle coupled by means of a coupling device to the vehicle 3, which forms the other part of the locomotive aggregate, in such manner that a so-called ideal turning point will be formed at 2 between the two vehicles. The frames of the two vehicles are designated with 4 and 5, respectively. Preferably, the locomotive aggregate is of hitherto known type, the rear vehicle 3 carrying a condenser and a driving device, for instance a steam turbine with appertaining mechanical power transmitting means. In case of the condenser comprising an air-cooled part co-operating with a fluid receptacle working with vacuum said fluid receptacle preferably forms itself the frame 5 of the vehicle 3. As apparent from Fig. 1, the frame 4 of the boiler vehicle 1 is placed partly on three pairs of wheels 6, 7 and 8 mounted in the frame and partly on a bogie 9 containing two pairs of wheels 10 and 11. The frame 5 of the condenser vehicle 3 is carried by two bogies 12 and 13, operatively connected to each other in such a way that a definite turning axis will be formed as at 23. The fore bogie 12 contains four pairs of wheels 14, 15, 16 and 17, while the rear bogie 13 contains two pairs of wheels 18 and 19. The bogies are capable of moving longitudinally relatively each other in order to permit running in curves.

In Fig. 2, wherein the same reference numerals are used for the parts shown in Fig. 1, it is shown how the wheels of the locomotive adjust themselves on the rails, when running in a curve. In the figure the distance 20 between the two circles designates the collar-play, said play in known manner corresponding to that length in axial direction which a pair of driving wheels may be moved from the position, in which the one collar bears against the one rail, to the position, in which the other collar bears against the other rail.

According to the invention the frame 5 of the condenser vehicle 3 is so placed as to be capable of turning relatively to the underlying bogie 12 and 13 about two points 21 and 22. The fore bogie 12 is capable of turning with respect to the frame 5 of the condenser vehicle about an axis passing through the turning point 21 located in the present case between the foremost pair of wheels of the bogie 12, preferably at the centre of said pair of wheels, whereas the turning axis of the rear bogie 13 relatively to the frame 5 of the condenser vehicle passes according to the invention through the point 22 located behind the rearmost pair of wheels 19 of the said bogie 13. The condenser frame 5 may be placed on the bogies at the said or other points, if only the turning axes of the bogies remain at 21 and 22 in Fig. 2. The several turning axes 23, 21 and 22 partly between the bogies 12 and 13 and partly between said bogies and the frame 5 may be obtained either by providing rigid couplings or mountings in the said points or by performing so called ideal turning points in said points by previously known arm couplings or the like. The vehicles may also be coupled together in such manner that the ideal turning point 2 formed between the vehicles coincides with the turning point 21 of the fore bogie of the condenser vehicle.

In the form of embodiment shown the wheels of the several bogies will follow the rails in a manner indicated in Fig. 2, the foremost pair of driving wheels 14 of the fore bogie 12 forming guide wheels for the bogie and containing wheels provided with collars. However, the collars of the wheels are reduced, so that the play of the pair of wheels will be somewhat greater than the normal play 20 represented by the distance between the circles. The subsequent pair of driving wheels 15 is movable axially and follows as does the fore pair of wheels 14 the outer rail. The wheels of the pair of wheels 16 have no collars and on account thereof the said pair of wheels takes up, relatively to the above described pairs of wheels, a position displaced somewhat more towards the side, whereas the rearmost pair of wheels 17, which is not axially movable, follows the inner rail. If the coupling point 23 of the bogies be placed far in the forward direction, the two pairs of wheels of the rearmost bogie will follow the inner rail, the fore wheels of said bogie being axially movable. The rear buffers of the condenser vehicle are placed in the form of embodiment shown on the bogie 13 which has in this case to be rigidly connected to the driving wheel bogie 12, for instance by a link. However, the buffers may also be placed at the frame of the condenser vehicle or at the condenser receptacle proper, because the sway of said receptacle has according to the invention been considerably reduced so that the coupling together with the following vehicle may be easily brought about, when the train runs in curves.

If, as has been hitherto usual, the rear turning point 22 lies in the centre of the rearmost bogie, for instance at 24, the condenser frame will, if the turning point 21 is not altered, adjust itself in accordance with the dotted line 25, whereby it is true, the sway of the vehicle at the centre will be less, but the sway of its rear end will be considerably greater as is the case in devices according to the present invention. The increased sway will really be still greater than that shown in the drawing, because the adjustment of the wheels on the rails will be more unfavourable, since especially the two pairs of wheels 18 and 19 of the rear bogie 13 will run closer to the outer rail, the case being the same if the two bogies are coupled together as before mentioned at 23. Thus, in order to obtain a small sway of the rear end of the vehicle it is also of importance that the rear bogie follows the inner rail, which will be obtained when the coupling at 23 is arranged in front of the point of intersection 26 between that line 12, which represents the centre line of the frame of the form bogie, and the dashed and dotted line 27 being a tangent from the point 22 to the inner circle.

When the locomotive runs in the backward direction in a similar or any other curve the positions of the several wheels will be somewhat different without the sways being so great as has hitherto been the case. For each curve having a certain radius of curvature it has proved that the sum of the sways at the centre and at the rear end of the vehicle is always constant when running forward as well as backward and when running from a curve to straight rails and vice versa, and thus it is important to distribute the said sum of sways in such manner that the sway of the centre of the condenser vehicle in such position of the locomotive, when said sway obtains its greatest value, will be equal to the sway of the rear end of the vehicle in such running of the locomotive, when said latter sway obtains its maximum, for instance when the greatest sway $a$ at the centre of the condenser vehicle in running forward is equal to the sway $b$ of the rear end of the vehicle when running in the backward direction.

The conditions will be the same when running the locomotive in curves having a different radius of curvature than that shown in Fig. 2.

Several forms of embodiment according to the invention may be thought of without departing from the scope of the invention. Obviously, the invention is independent of the number of wheels contained in each bogie and of the form of the frame of the vehicle. The wheels of the bogies may all or in part be driving wheels independent of the wheels and driving wheels, respectively, of the boiler vehicle and the arrangement of said wheels.

What I claim as new and desire to secure by Letters Patent of the United States of America is:—

A locomotive, comprising two vehicles, a boiler placed on the one vehicle and a condenser placed on the second vehicle, a coupling connecting said vehicles and adapted to provide a definite turning axis between them, two interconnected bogies for the frame of the condenser vehicle, means to operatively connect said bogies so that a turning of the one bogie will cause a turning of the second bogie, the turning axis of the rearmost bogie of the condenser vehicle relatively to the frame of said vehicle being located behind the rear pair of wheels of said bogie counted in the normal running direction of the locomotive, and the said turning axis as well as the turning axis of the foremost bogie being so located, that the maximum sway at the center of the vehicle will be substantially equal to the maximum sway of the rear end of the condenser vehicle.

In testimony whereof I affix my signature.

ISIDOR BROBERG.